United States Patent [19]

Furuya et al.

[11] 4,348,341
[45] Sep. 7, 1982

[54] PROCESS FOR PRODUCTION OF PRECURSOR OF ALUMINA FIBER

[75] Inventors: Takeshi Furuya; Yoshihisa Uchiyama; Akinori Kouda, all of Ohmi, Japan

[73] Assignee: Denki Kagaku Kogyo Kabushiki Kaisha, Tokyo, Japan

[21] Appl. No.: 167,745

[22] Filed: Jul. 14, 1980

Related U.S. Application Data

[63] Continuation-in-part of Ser. No. 70,528, Aug. 28, 1979, abandoned.

[30] Foreign Application Priority Data

Aug. 28, 1978 [JP] Japan ............................. 53-103850

[51] Int. Cl.³ ............................................. B01J 2/04
[52] U.S. Cl. ......................................... 264/8; 264/14
[58] Field of Search .................................. 264/8, 14

[56] References Cited

U.S. PATENT DOCUMENTS

| 3,097,085 | 7/1963 | Wallsten | 264/8 |
| 3,360,592 | 12/1967 | Rau et al. | 264/8 |
| 3,429,953 | 2/1969 | Crompton | 264/8 |

FOREIGN PATENT DOCUMENTS 1360197 7/1974 United Kingdom .

Primary Examiner—James R. Hall
Attorney, Agent, or Firm—Stevens, Davis, Miller & Mosher

[57] ABSTRACT

Disclosed herein is a process for the production of the precursor of alumina fiber. The process comprises causing a thick solution for alumina fiber having a viscosity in the range of from 500 to 2000 cps to be continuously fed through the feed pipe protruding into the opening at the center of a funnel-shaped disk and to be sent flying with hot compressed air and thereby converting the thick solution into fibers.

7 Claims, 4 Drawing Figures

PROCESS FOR PRODUCTION OF PRECURSOR OF ALUMINA FIBER

This application is a continuation-in-part of Ser. No. 70,528, 8-28-79, abandoned.

BACKGROUND OF THE INVENTION

1. Field of the Invention

This invention relates to a process for the continuous production of a precursor of alumina fiber.

2. Description of the Prior Art

Heretofore various processes and apparatus have been proposed for the production of alumina fiber. For example, British Pat. No. 1,360,197 teaches an apparatus for the production of rayon fiber. During operation of the apparatus a solution is extruded through a spinneret with about 400 micron diameter dies and is blown with the air discharged through two nozzles that are disposed so as to converge at an angle of about 30° in the direction of air blowing.

For the invention of this British patent to permit effective mass production of rayon fiber, installation of a multiplicity of extruders in a plurality of rows is necessary. Because of the restrictions arising from the nature of the apparatus designed primarily for the production of rayon fiber, the mat of alumina fiber to be produced by this apparatus assumes the form of a laminate of thin webs and therefore is quite susceptible to separation into individual webs of the laminate. Thus, the alumina fiber mat in its unmodified form cannot be effectively used as a lining material for furnaces. To serve advantageously as the lining material, the alumina fiber must be used in the form of a blanket mixed with rayon fiber.

SUMMARY OF THE INVENTION

After a diligent study, the present inventors have developed an improved method capable of remedying the disadvantage suffered by the conventional method for alumina fiber production as described above. It is, therefore, an object of this invention to provide a process for the production of an alumina fiber mat free from the phenomenon of layer separation.

More specifically, the present invention relates to a process for the production of a precursor of alumina fiber, which process comprises causing a thick aqueous solution for alumina fiber to be continuously supplied to and uniformly dispersed on the inclined surface of a funnel-shaped disk in rotation via a feed pipe projecting through an opening at the center of the funnel-shaped disk and to be sent flying with hot compressed air and thereby converting the thick aqueous solution into alumina fiber precursors. The apparatus used in the invention comprises a funnel-shaped disk used directly in the aforementioned process, a hollow rotary shaft connected to the center of the reverse side of the funnel-shaped disk, a feed pipe disposed within the hollow portion of the rotary shaft, with the leading end of the feed pipe projecting through the opening at the center of the funnel-shaped disk, and a pipe disposed around the funnel-shaped disk for discharge of a compressed fluid.

DETAILED DESCRIPTION OF THE PREFERRED EMBODIMENT

Figure 1:
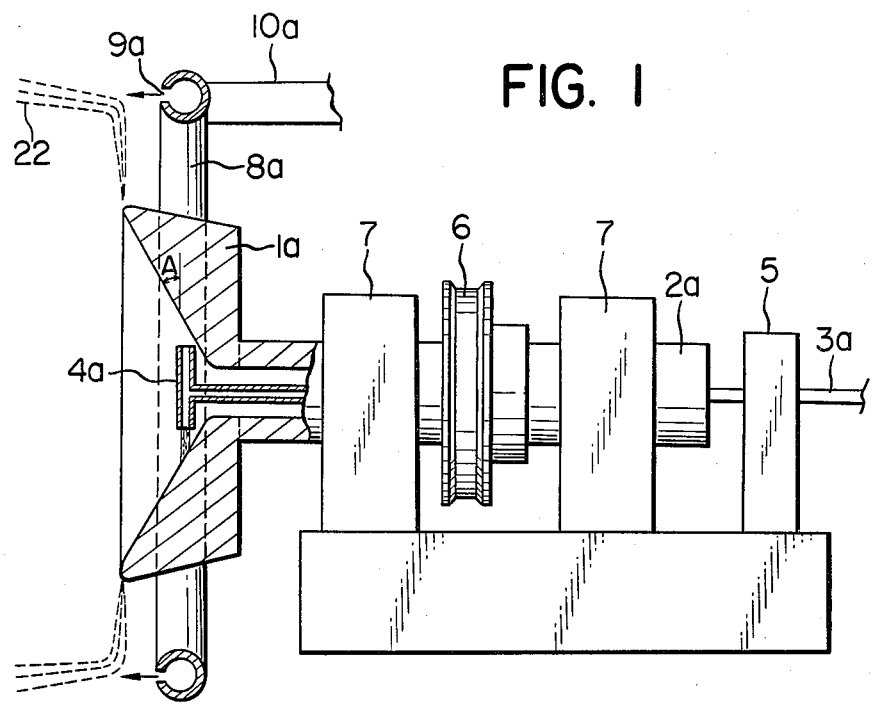
FIG. 1 and FIG. 2 are each an elevational view, partly in section, of the rotary disk used in a preferred embodiment of the present invention.

The words "alumina fiber" as used in the present invention mean a fiber that contains 80 to 100% by weight of an $Al_2O_3$ component, with $SiO_2$, $MgO$, $Fe_2O_3$, $Na_2O$, etc. accounting for the balance to make up 100% by weight. The alumina fiber is made up of monofilaments ranging in diameter from 0.1 to $10\mu$, preponderantly from 2 to $4\mu$. The words "precursor of alumina fiber" as used similarly herein mean a fibrous intermediate which is converted by means of a rotary disk from a thick aqueous solution for alumina fiber which is converted into alumina fiber when it is fired.

Now, the process of this invention will be described. The thick aqueous solution employed contains from 20 to 35% by weight, calculated as $Al_2O_3$, of basic aluminum chloride, wherein the ratio of aluminum to chlorine is between 1.5 to 1 and 2.2 to 1, preferably between 1.7 to 1 and 2.0 to 1. The solution can contain up to 10% by weight of colloidal silica, whose particle size is small enough to form a colloid when dispersed in water. The colloidal silica improves the flexibility of fiber.

The solution contains from 0.2 to 5% by weight of polyvinyl alcohol which improves the fiber-forming ability of the solution. The viscosity of the solution is from 500 to 2,000 centipoises. Lower or higher viscosity may result in poor fiber when the solution is fiberized by the method of this invention. The aforementioned solution is introduced into the feed pipe 3 by the pump 19. On emerging from the leading end 4 of the feed pipe 3, the thick solution is uniformly spread in the form of a film on the entire inclined surface of the funnel-shaped disk 1 being rotated at a high speed, and then sequentially shaken off the peripheral edge of the disk 1 in the form of droplets. When the droplets of thick solution thus shaken about radially collide against a high-pressure fluid such as, for example, hot compressed air, which is spurted out of a multiplicity of apertures 9 spaced throughout the entire circumference of a doughnut-shaped blow pipe 8 disposed in a position encircling the disk 1, they are stretched and dried and, as a result, converted into filaments 22. Filaments dried are collected on a mesh belt 23 and form the mat 27 of the precursor fiber.

According to the process described above, since the mat of the precursory fiber comprises the filaments produced in consequence of the flight of the droplets in all the directions around 360°, the mat is built up with filaments in an extremely random arrangement. Thus, the mat of this fiber is free from the problem of layer separation.

Now, the conditions under which the funnel-shaped disk and the blow pipe are operated will be described. Unlike the manufacture of wools such as glass wool, rock wool and ceramic fiber from their respective molten stocks, the production of alumina fiber generally does not suffer from the trouble of clogging in the feed apertures and permits prolonged supply of the thick solution. Nevertheless the individual filaments of the freshly formed precursory fiber retain moisture and tend to stick to one another. For this reason, the produced filaments must be thoroughly dried during flight. The apparatus used for the conversion of the thick solution into the filaments is particularly effective when the thick solution has a viscosity in the range of from 500 to 2,000 centipoises.

In the case of the funnel-shaped disk of the construction illustrated in the preferred embodiment, the disk's effect of fibrizing the thick solution is maximized when the inclination (FIG. 1-A, FIG. 2-B) of the surface of the disk relative to the plane perpendicular to the rotary shaft falls in the range of from 20 to 40 degrees, preferably from 25 to 35 degrees. In the case of a apparatus operated with the feed rate of the thick solution in the range of from 10 to 40 kg/hr, the disk proves to be advantageous for the operation when the diameter at the periphery of the disk falls in the range of from 50 to 500 mm, preferably from 100 to 300 mm. The number of rotations of the disk is to be fixed so that the circumferential velocity of the disk falls in the range of from 30 to 50 m/sec.

In the meantime, the blow pipe necessitates projection of a fluid with force enough to change, by an angle of 90°, the direction in which the droplets have been centrifugally dispersed and sent flying. The blow pipe is a doughnut-shaped pipe encircling the disk and has a multiplicity of apertures 2 mm in diameter spaced at a fixed interval throughout the entire periphery thereof. In the case of the disk satisfying the specification described above, the size of this doughnut-shaped pipe is produced such that the diameter thereof as measured relative to the circumference passing the centers of the apertures is 50 to 150 mm larger than that of the disk. Compressed air serves advantageously as the fluid for this projection. The pressure used for the projection is in the range of from 5 to 10 kg/cm$^2$G. The air for the projection is supplied in a state heated in the range of from 100° to 300° C. The ambient air in which the filaments are sent flying, dried and maintained at a temperature of from 30° to 60° C. and a relative humidity of from 50 to 80%. When the fiber mat is given a thermal treatment (FIG. 4), it can be put to use as a mat of polycrystalline alumina fiber.

Figure 3:
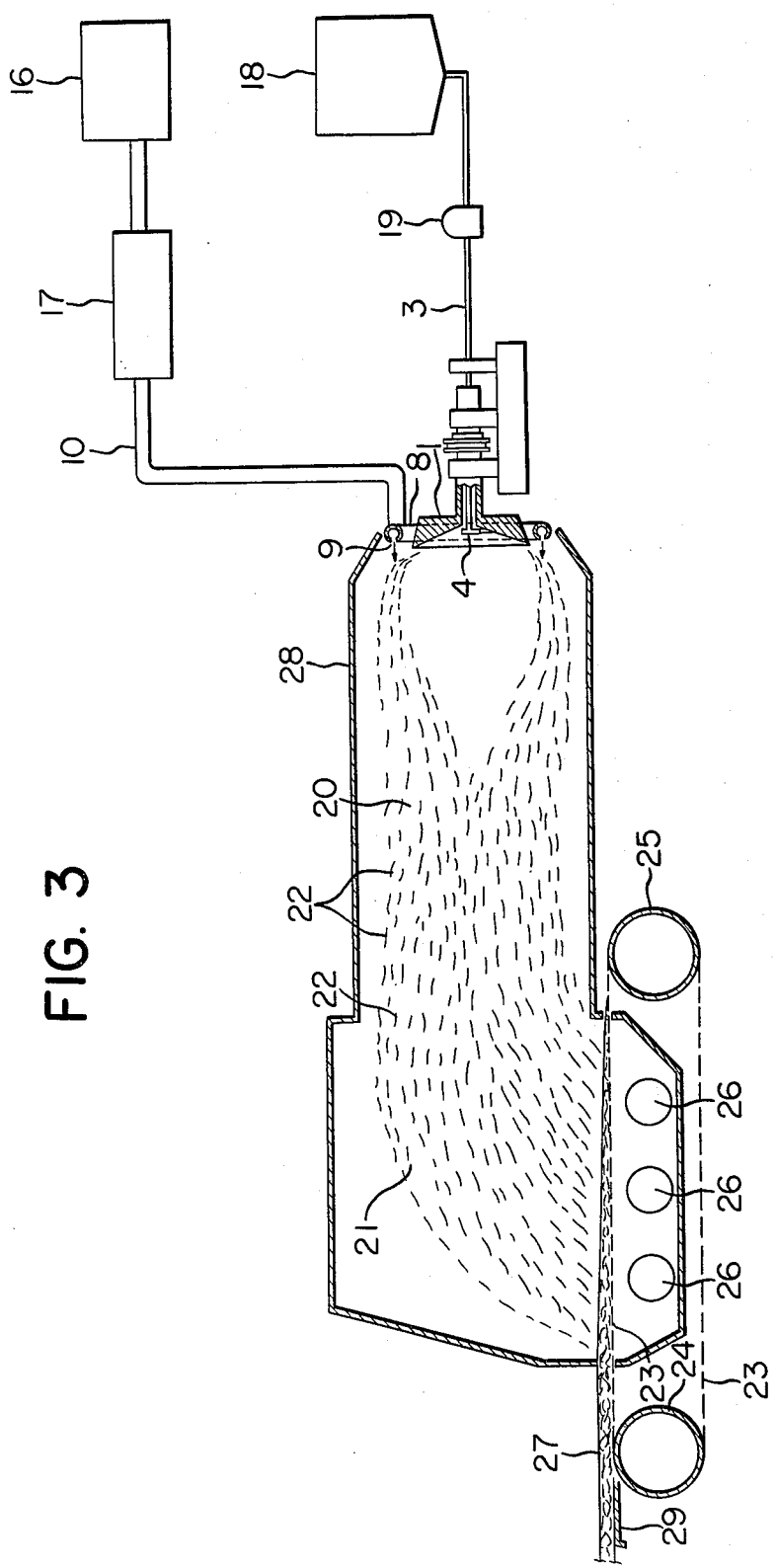
FIG. 3 is a diagram illustrating the process of the present invention.

FIG. 3 is a diagram showing the steps of operations for fiberizing and drying of the filaments. The thick solution of alumina-forming composition is derived from a tank 18 and sent to the disk 1 through the feed pipe 3 by the pump 19. This solution is centrifugally dispersed by the disk 1 and blown away by hot compressed air which is forced by compressor unit 16 through heating means 17 and pipe 10. The dispersed and blown solution is thoroughly dried in the drying zone 20 and converted into filaments 22. Filaments 22 are collected on the mesh belt 23 which is driven by the rollers 24 and 25, in the collecting zone 21 by drawing the used gas through exhaust pipes 26. The collected filaments, i.e. the precursor of alumina fiber, form the mat 27, which is conveyed from drying and collecting unit 28 and transported on the guide plate 29 to the firing unit 30 of FIG. 4.

Figure 4:
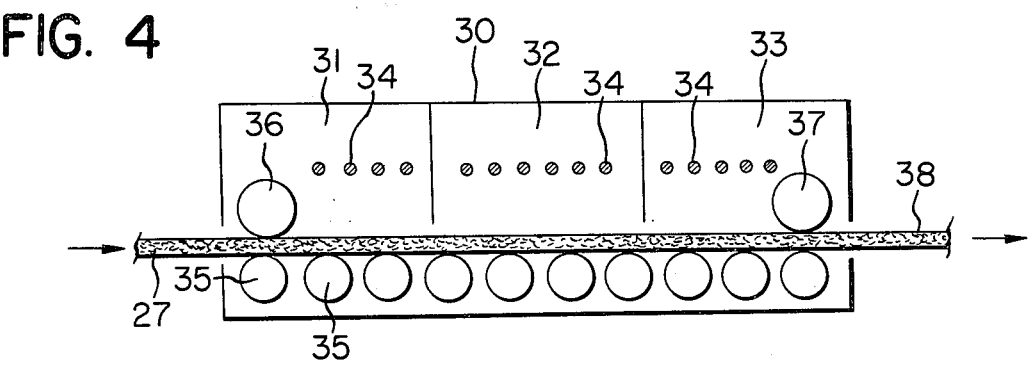
FIG. 4 is a diagram illustrating the process of firing.

The firing unit 30 of FIG. 4 has its interior divided into three zones and has the group of heater elements 34, the first zone 31 maintained at temperatures in the range of from 500° to 800° C., the second zone 32 at temperatures in the range of from 800° to 1100° C. and the third zone 33 at temperatures in the range of from 1100° to 1400° C. respectively. On entering the firing unit 30, the mat 27 which has been received from the drying and collecting unit 28 is conveyed along under the firing unit 30 by virtue of the rotation of the group of ceramic rollers 35. The rollers 36 and 37 disposed on the mat 27 are intended for the adjustment of the thickness of this mat. The fired mat 38 consequently obtained from this firing treatment, which is now in the form of a polycrystalline alumina fiber, can be handled as a bulk fiber as it is. It may otherwise be given additional treatment and used in the form of blankets and boards.

Now, the apparatus used in the process of this invention will be described with reference to the accompanying drawings.

FIG. 1 is an elevational view, partly in section, of one preferred embodiment of the apparatus to be used in executing this invention. The funnel-shaped disk 1a has a hollow rotary shaft 2a connected to the center of its reverse side. This rotary shaft is held by suitable bearing devices 7 and is capable of high-speed rotation by the belt pulley 6 which is driven by a suitable electric motor (not shown). The feed pipe 3, leading to the feed pump 19 (FIG. 3), is fixed by the suitable holder 5 and disposed in the hollow interior of the hollow rotary shaft 2a. The leading end portion 4a of the feed pipe 3a protrudes into the opening at the center of the disk and has a T-shaped cross section. By giving a T-shaped cross section to the leading end portion of the feed pipe, the thick solution is allowed to collide uniformly into and evenly disperse on the inclined surface of the disk.

The doughnut-shaped pipe 8a, leading to the heating means 17 (FIG. 3) and the compressor 16 (FIG. 3) by the pipe 10a, has a multiplicity of apertures 9a spaced at fixed intervals throughout the entire periphery thereof and is set up at the circumference of the disk 1a. From these apertures 9a, the hot compressed air blows out and the droplets are blown away with it.

Figure 2:
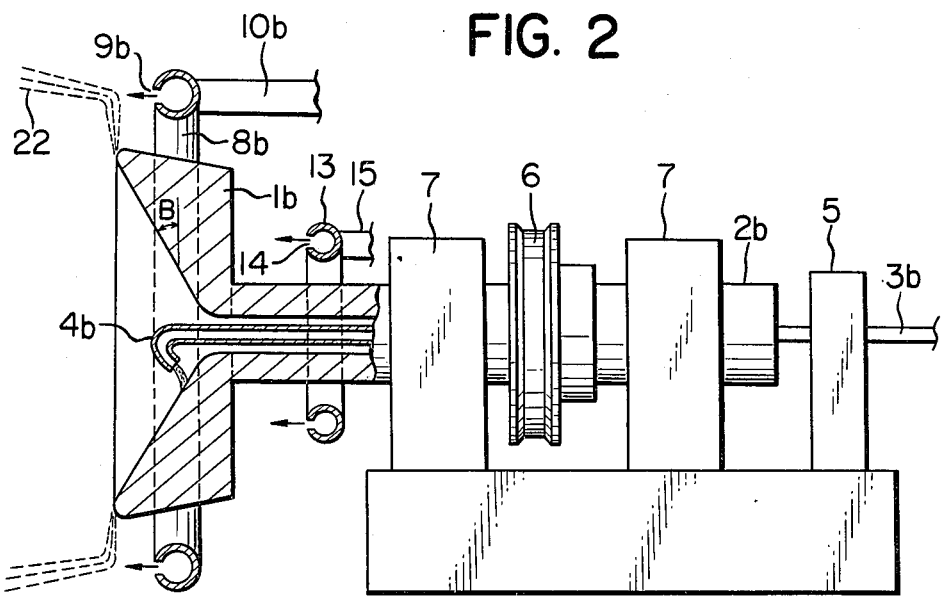

FIG. 2 illustrates another preferred embodiment of the apparatus used to convert the thick solution into the fibers. The apparatus illustrates here is different from the apparatus of FIG. 1 only in respect that the leading end portion 4b of the feed pipe 3b is formed in the shape of a hook and that the apparatus is additionally provided with an air-cooling device in the form of a doughnut-shaped blow pipe 13 which has a multiplicity of apertures 14 and connected to an compressor (not shown) by the pipe 15. From this aperture 14, the compressed air blows out and serves as a mechanism for cooling the disk. The reason for air-cooling the disk is that this cooling effectively precludes the possibility that the surface of the disk, when exposed to the hot compressed air, will cause part of the film dispersed thereon to be evaporated and solidified to the extent of rendering difficult smooth continuation of the centrifugal dispersion of the thick solution. For this purpose, it is similarly effective to fabricate the disk in a hollow construction and connect the hollow interior of the disk to a cooling water pipe.

The precursor of alumina fiber produced by this invention as described above has the gloss of silk. Through a polarizing microscope, it looks like glass wool. The individual fibers have minute diameters of from 2 to 4 microns and they are independent of one another. Moreover, they are very smooth and contain substantially no detectable shots.

EXAMPLE 1:

A thick aqueous solution having an Al$_2$O$_3$ concentration of 28% by weight and a viscosity of 1500 cp was prepared by mixing 10 kg of a basic aluminum chloride solution having an Al:Cl molar ratio of 1.83 and an Al$_2$O$_3$ concentration of 20% by weight with 1 kg of an aqueous solution containing 10% by weight of a polyvinyl alcohol (a product of Denki Kagaku, marketed under the trade name "Denka Poval B-17") and subjecting the mixture to concentration under vacuum. In the apparatus of FIG. 2, this thick solution was fed to the surface of the rotary disk 100 mm in diameter at a feed rate of 10 kg/hr. The apparatus was operated with the disk rotated at 5800 rpm, the air projected from the blow pipe at a pressure of 6 kg/cm$^2$G and the projected air kept at a temperature of 150° C. The droplets of thick solution blown with air were passed through an ambient zone kept under the conditions of 40° C. of temperature and 70% of relative humidity and the precursor fibers were collected on a mesh belt. The hot air used for the conversion of the thick solution into the filaments was released through the mesh belt into the atmosphere. The fibers thus obtained had a diameter of 3 microns and were randomly curled and were assembled in the form of a mat. By a thermal treatment, this mat was converted into a polycrystalline alumina fiber mat.

EXAMPLE 2:

In the apparatus of FIG. 1, the thick aqueous solution of Example 1 was fed to the disk 100 mm in diameter at a feed rate of 20 kg/hr. The precursor fibers were obtained by operating the apparatus with the disk rotated at 7600 rpm, the air projected under a pressure of 7 kg/cm$^2$G and the projected air kept at a temperature of 200° C. The ambient zone through which the droplets of the thick solution were sent flying was maintained under the conditions of 50° C. of temperature and 60% of relative humidity. The precursor fibers were 2.5 microns in diameter and formed a mat free from the phenomenon of layer separation.

EXAMPLE 3:

To 25 kg of a basic aluminum chloride solution having an Al:Cl molar ratio of 1.90 and an Al$_2$O$_3$ concentration of 25% by weight were added 1.5 kg of colloidal silica (a product of Nissan Chemical having an SiO$_2$ concentration of 20% by weight, marketed under the tradename "Snowtex-O") and 3 kg of an aqueous solution containing 10% by weight of a partially saponified polyvinyl alcohol having an average polymerization degree of 1700 (a product of Denki Kagaku, marketed under the tradename "Denka Poval B-17"). The resultant mixture was stirred and, at the same time, concentrated under vacuum to obtain a thick solution having a total Al$_2$O$_3$+SiO$_2$ concentration of 31% by weight and a viscosity of 1800 cp.

Under the same operating conditions as those of Example 1, this thick solution was converted into the precursor fibers which were collected on a mesh belt. The fiber had the gloss of silk. By a thermal treatment, the precursor fiber was converted into a crystalline alumina-silica fiber.

EXAMPLE 4:

To 20 kg of a basic aluminum chloride solution having an Al:Cl molar ratio of 1.79 and an Al$_2$O$_3$ concentration of 22% by weight were added 5 kg of Colloidal Silica (a product of Nissan Chemical having an SiO$_2$ concentration of 20% by weight, marketed under the trade name "Snowtex-O") and 2 kg of an aqueous solution containing 10% by weight of a partially saponified polyvinyl alcohol having an average polymerization degree of 1700 (a product of Denki Kagaku, marketed under the trade name "Denka Poval B-17"). The resultant mixture was stirred and, at the same time, concentrated under vacuum to afford a thick solution having a total Al$_2$O$_3$+SiO$_2$ concentration of 27% by weight and a viscosity of 800 cp.

Under the same operating conditions as those of Example 2, this thick solution was converted into the fiber, giving rise to a precursor fiber mat resembling floss silk. By a thermal treatment, this mat was converted into a polycrystalline alumina-silica fiber mat.

The polycrystalline alumina fiber which is produced by firing the precursor of alumina fiber of this invention has unusually high resistance to heat of up to 1600° C. and exhibits outstanding resistance to passage of wind, heat conduction and spalling and, therefore, is highly recommendable as a refractory material for lining industrial furnaces which are operated at high temperatures. The polycrystalline alumina fiber produced by this invention comprises minute fibers which possess a gloss resembling the gloss of silk and, when observed through a polarizing microscope, look just like glass wool. These fibers have a minute diameter of from 2 to 4 microns and are independent of one another. Moreover, they are very smooth and show substantially no detectable shots. In the phase of mechanical strength, the fibers excel in flexibility and exhibit high elasticity under a compressive load.

The reason for such outstanding heat resistance and mechanical properties is that the fiber of this invention, as is clearly demonstrated by the X-ray diffraction, is formed of a polycrystalline mass resulting from the aggregation of minute crystalline particles, i.e. that the minute crystals are mutually bound with strength and intimacy enough to form a closely interwoven fiber.

What is claimed is:

1. A process for the production of a precursor of a polycrystalline alumina fiber comprising
   (a) continuously feeding an aqueous solution containing (i) 20 to 35% by weight, calculated as Al$_2$O$_3$, of basic aluminum chloride, (ii) up to 10% by weight of colloidal silica, and (iii) 0.2 to 5% by weight of polyvinyl alcohol and having a viscosity of 500 to 2,000 centipoise through the center of a rotating funnel-shaped disk to the inclined surface of said disk;
   (b) atomizing said aqueous solution by the centrifugal force of said rotating disk to form droplets;
   (c) contacting the droplets of step (b) with a high-pressure fluid to dry and convert said droplets into filaments; and
   (d) collecting the filaments in the form of a mat.

2. The process of claim 1 wherein the inclined surface of said disk has an angle of 20° to 40° relative to a plane perpendicular to the center of said disk.

3. The process of claim 1 wherein said disk is rotating at a circumferential velocity of 30 to 50 m/sec.

4. The process of claim 1 wherein said high-pressure fluid is air.

5. The process of claim 4 wherein the air is at a pressure of 5 to 10 kg/cm$^2$G.

6. The process of claim 5 wherein the air is at a temperature of 100° to 300° C.

7. The process of claim 1 wherein the filaments have a diameter of 0.1 to 10 microns.

* * * * *